United States Patent [19]

Ohtsuka et al.

[11] Patent Number: 6,049,555

[45] Date of Patent: Apr. 11, 2000

[54] LASER-DIODE-PUMPED SOLID STATE LASER

[75] Inventors: Hisashi Ohtsuka; Yoji Okazaki; Hiroaki Hyuga, all of Kanagawa-ken, Japan

[73] Assignee: Fuji Photo Film Co., Ltd., Kanagawa-ken, Japan

[21] Appl. No.: 09/008,073

[22] Filed: Jan. 16, 1998

[30] Foreign Application Priority Data

Jan. 16, 1997 [JP] Japan ..................................... 9-005298

[51] Int. Cl.[7] ....................................................... H01S 3/04
[52] U.S. Cl. .................. 372/34; 372/92; 372/75; 372/19; 372/36
[58] Field of Search ................. 372/34, 92, 75, 372/19, 36

[56] References Cited

U.S. PATENT DOCUMENTS 5,793,792  8/1998  Baxter et al. .............................. 372/92
5,848,092 12/1998  Mitsumoto et al. ....................... 372/34

*Primary Examiner*—Leon Scott, Jr.
*Attorney, Agent, or Firm*—Sughrue, Mion, Zinn, Macpeak & Seas, PLLC

[57] ABSTRACT

A laser-diode-pumped solid state laser in which a solid state laser crystal is pumped by a light beam produced by a laser diode and which is not lower than 10 W in the internal power of the resonator includes a temperature control circuit which keeps the inside temperature of a resonator at a predetermined temperature and, a wavelength selector which is disposed in the resonator and selects one of a plurality of oscillation modes in the resonator, thereby making the laser oscillate in a single mode. The wavelength selector has characteristics such that the increase in temperature of the wavelength selector due to absorption of a laser beam is smaller than a value such that when the temperature of the wavelength selector changes by the value or more, the oscillation mode selected by the wavelength selector changes.

4 Claims, 5 Drawing Sheets

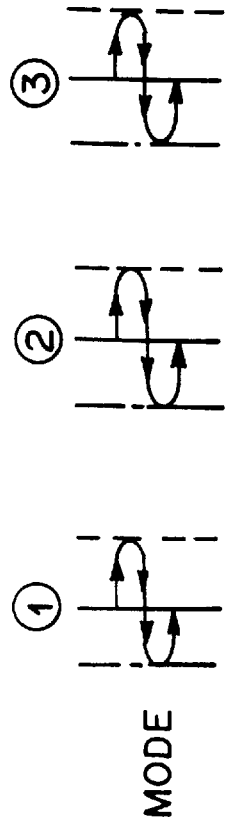
FIG. 5

LASER-DIODE-PUMPED SOLID STATE LASER

BACKGROUND OF THE INVENTION

1. Field of the Invention

This invention relates to a laser-diode-pumped solid state laser in which a solid state laser crystal is pumped by a laser diode (semiconductor laser), and more particularly to such a laser-diode-pumped solid state laser of a relatively high output type where the resonator internal power reaches 10 W or more.

2. Description of the Related Art

As disclosed, for instance, in Japanese Unexamined Patent Publication No. 62(1987)-189783, there has been known a laser-diode-pumped solid state laser in which a solid state laser crystal doped with a rare earth element such as neodymium is pumped by a light beam produced by a laser diode.

Such a laser-diode-pumped solid state laser is generally provided with a wavelength selector which selects one of a plurality of oscillation modes in the resonator and makes the laser oscillate in a single longitudinal mode.

Further in the laser-diode-pumped solid state laser, the temperatures of the solid state laser crystal and the resonator are generally controlled to predetermined temperatures in order to suppress fluctuation in the oscillating wavelength. The temperature control is generally effected by placing the resonator on a cooling surface of an electronic cooling element (a Peltier element), detecting the inside temperature of the resonator and controlling the electronic cooling element on the basis of the detected inside temperature of the resonator.

Further, in the laser-diode-pumped solid state laser, the intensity of at least a part of a solid state laser beam emitted from the resonator (may be a wavelength-converted laser beam) is detected by a photodetector and the laser diode is controlled on the basis of the output signal of the photodetector so that the output of the laser diode is kept constant, thereby stabilizing the output of the solid state laser. This control is generally referred to as "an automatic power control".

Conventionally most of the laser-diode-pumped solid state lasers are of a relative low output, lower than 10 W in the resonator internal power. In such a laser-diode-pumped solid state laser, the oscillating wavelength and the output are generally stabilized by providing a wavelength selector and controlling the temperature of the resonator.

However in the recent laser-diode-pumped solid state laser which is relatively high in output power, not lower than 10 W in the internal power of the resonator, there has been a problem that the longitudinal mode hops even if a wavelength selector is provided and the temperature of the resonator is controlled. Further, in the conventional high output type laser-diode-pumped solid state laser, there have been problems that a plurality of longitudinal modes are generated for a long time upon starting of the laser and the output becomes unstable and that noise is generated due to mode competition.

SUMMARY OF THE INVENTION

In view of the foregoing observations and description, the primary object of the present invention is to provide a relatively high output laser-diode-pumped solid state laser which can stably operate in a single longitudinal mode and can be started in a stable state.

In accordance with the present invention, there is provided a laser-diode-pumped solid state laser in which a solid state laser crystal is pumped by a light beam produced by a laser diode and which is not lower than 10 W in the internal power of the resonator and comprises a temperature control means which keeps the inside temperature of a resonator at a predetermined temperature and, a wavelength selector which is disposed in the resonator and selects one of a plurality of oscillation modes in the resonator, thereby making the laser oscillate in a single mode, wherein the improvement comprises that the wavelength selector has characteristics such that the increase in temperature of the wavelength selector due to absorption of a laser beam is smaller than a value such that when the temperature of the wavelength selector changes by the value or more, the oscillation mode selected by the wavelength selector changes.

More specifically a wavelength selector whose increase in temperature due to absorption of a laser beam is smaller than 2° C. is employed.

The inventors have found that the problem inherent to the conventional high output laser-diode-pumped solid state lasers is due to a localized temperature increase in the resonator, which cannot take place in low output laser-diode-pumped solid state lasers. This point will be described in more detail, hereinbelow.

FIG. 2 shows the relation between the pumping power and the laser output in a low output laser-diode-pumped solid state laser. In addition, the relation between the oscillation mode and the wavelength selected by the wavelength selector is shown in FIG. 2 for five regions where the pumping power is different from each other. As can be understood from FIG. 2, the relation between the oscillation mode and the wavelength selected by the wavelength selector is substantially kept unchanged irrespective of the pumping power. Accordingly, the same oscillation mode (mode 1 in the example shown in FIG. 2) is selected irrespective of the pumping power and the solid state laser oscillates in a constant single longitudinal mode over the entire range of the pumping power.

In contrast, in the case of a high output laser-diode-pumped solid state laser, the relation between the pumping power and the laser output and the relation between the oscillation mode and the wavelength selected by the wavelength selector are as shown in FIG. 3. That is, in this case, as the pumping power increases, the temperature of the wavelength selector greatly increases and the wavelength selected by the wavelength selector changes, whereby the selected oscillation mode changes in sequence from mode 1 to mode 2, from mode 2 to mode 3, and so on. Thus mode hop occurs.

When mode hop occurs, there are generated regions where the laser output falls and accordingly, it becomes difficult for the solid state laser to operate at a high output and at the same time the automatic power control becomes unstable.

The temperature increase of the wavelength selector is considered to be due to the following reason. That is, the internal power of the resonator normally reaches several to several tens times the output of the laser. Further the internal power of the wavelength selector such as an etalon disposed in the resonator reaches several to several tens times the internal power of the resonator due to multipath reflection of the laser beam between a pair of faces thereof. Thus large absorption occurs in the wavelength selector and the temperature locally rises near the optical axis of the wavelength selector even if the temperature of the resonator is controlled.

In the laser-diode-pumped solid state laser in accordance with the present invention, since there is employed a wavelength selector having characteristics such that the increase in temperature of the wavelength selector due to absorption of a laser beam is smaller than a value such that when the temperature of the wavelength selector changes by the value or more, the oscillation mode selected by the wavelength selector changes, mode hop cannot take place even if the pumping power is increased. Accordingly when the automatic power control is effected, a stable operation of the laser can be obtained. Further when the laser beam absorption of the wavelength selector is small, loss is small and accordingly output of the laser is increased.

In order to prevent localized temperature increase in the wavelength selector, it is preferred that other optical elements such as a half-silvered mirror for splitting light for the aforesaid automatic power control be of low absorption characteristics.

The problems in the conventional high output laser-diode-pumped solid state lasers that a plurality of longitudinal modes are generated for a long time upon starting of the laser and the output becomes unstable and that noise is generated due to mode competition are due to transient temperature increase in the resonator. This point will be described with reference to FIGS. 4 and 5, hereinbelow.

FIG. 4 shows change in the temperature of the resonator with time during starting of the laser. As can be seen from FIG. 4, even if the temperature of the resonator is controlled, transient temperature increase occurs before the temperature of the resonator is converged on a target temperature.

FIG. 5 shows the relation between the pumping power and the laser output and the relation between the oscillation mode and the wavelength selected by the wavelength selector when the transient temperature increase is relatively large. If each of oscillation modes 1, 2 and 3 is stable as shown by the solid line, the relation between the pumping power and the laser output is as shown by the solid line in FIG. 5 as described above with reference to FIG. 3.

However when the transient temperature increase ΔTcav is large, each of oscillation modes 1, 2 and 3 fluctuates. For example, when the oscillation modes 1, 2 and 3 become as shown by the dashed line, the relation between the pumping power and the laser output becomes as shown by the dashed line, and when the oscillation modes 1, 2 and 3 become as shown by the chained line, the relation between the pumping power and the laser output becomes as shown by the chained line. That is, in this case, a plurality of longitudinal modes appear one by one in response to the transient temperature change in the resonator, and accordingly the output becomes unstable and noise due to mode competition is generated.

In the laser-diode-pumped solid state laser of the present invention, since the laser beam absorption of the wavelength selector is small, the transient temperature increase ΔTcav of the resonator can be suppressed small. Accordingly, the time for which a plurality of longitudinal modes appear to make stable the laser output and noise is generated due to mode competition can be shortened and the laser can be stably started.

BRIEF DESCRIPTION OF THE DRAWINGS

FIG. 5 is a view showing the relation between the pumping power and the laser output and the relation between the oscillation mode and the wavelength selected by the wavelength selector when the transient temperature increase during starting of the laser is relatively large.

DESCRIPTION OF THE PREFERRED EMBODIMENT

Figure 1:
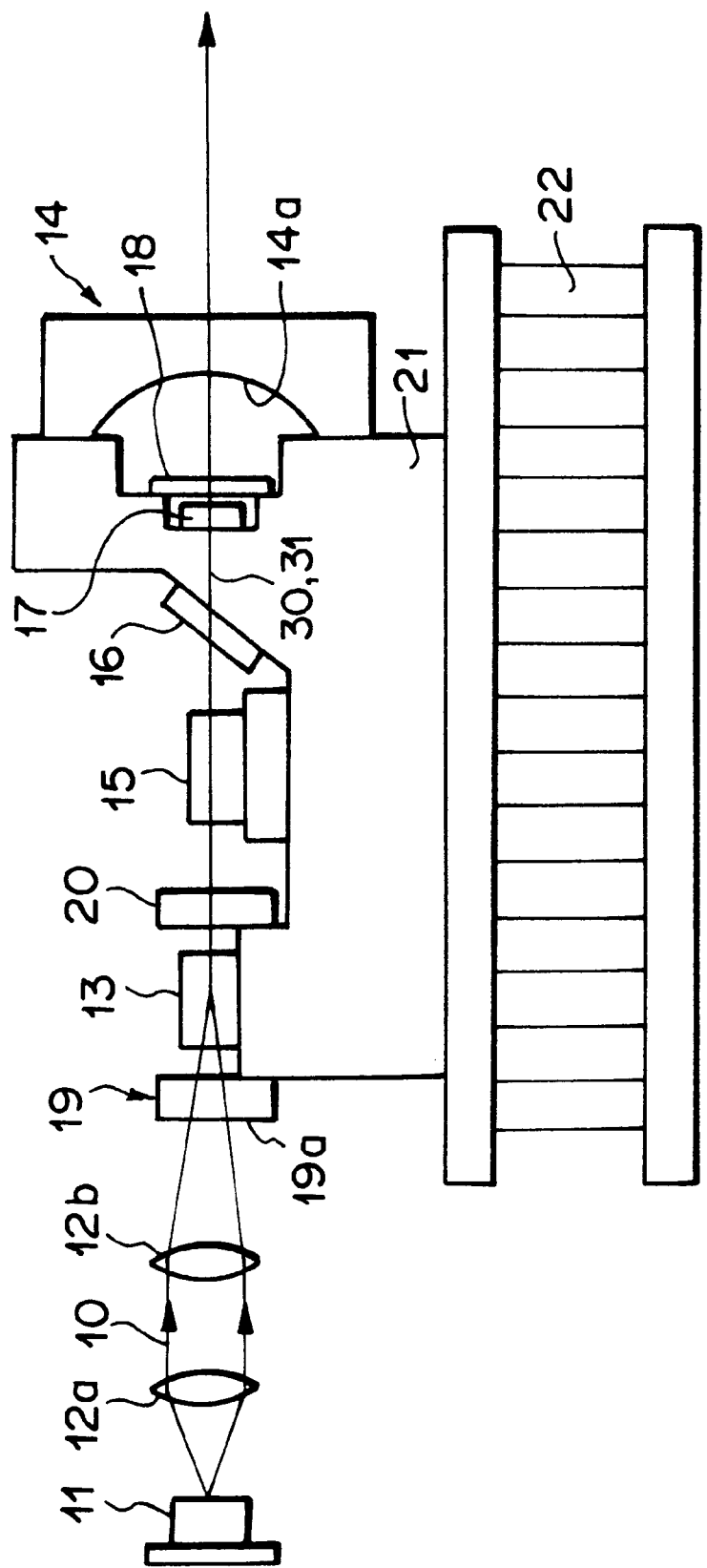
FIG. 1 is a side view of a laser-diode-pumped solid state laser in accordance with an embodiment of the present invention.
Figure 2:
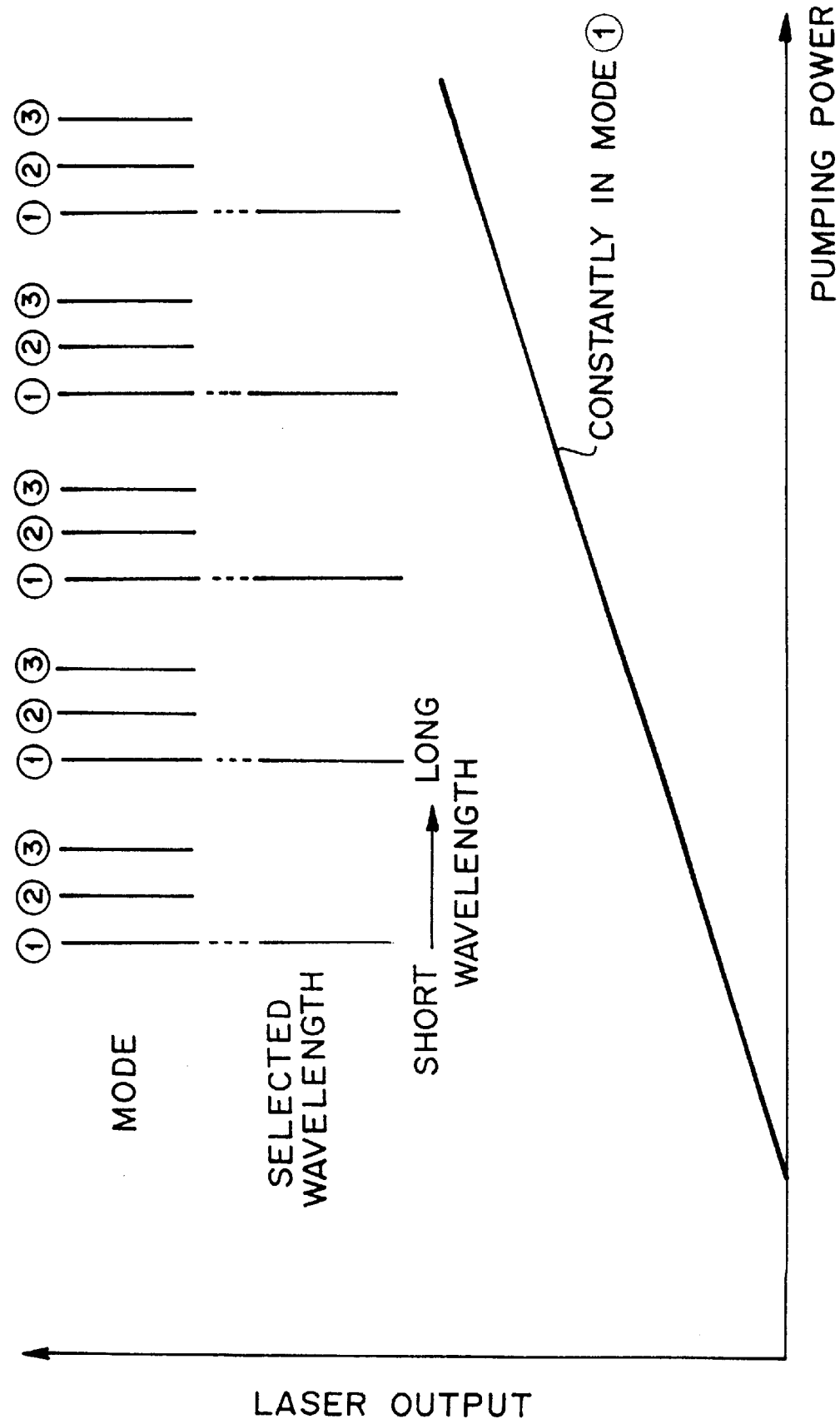
FIG. 2 is a view showing the relation between the pumping power and the laser output and the relation between the oscillation mode and the wavelength selected by the wavelength selector in a low output laser-diode-pumped solid state laser.
Figure 3:
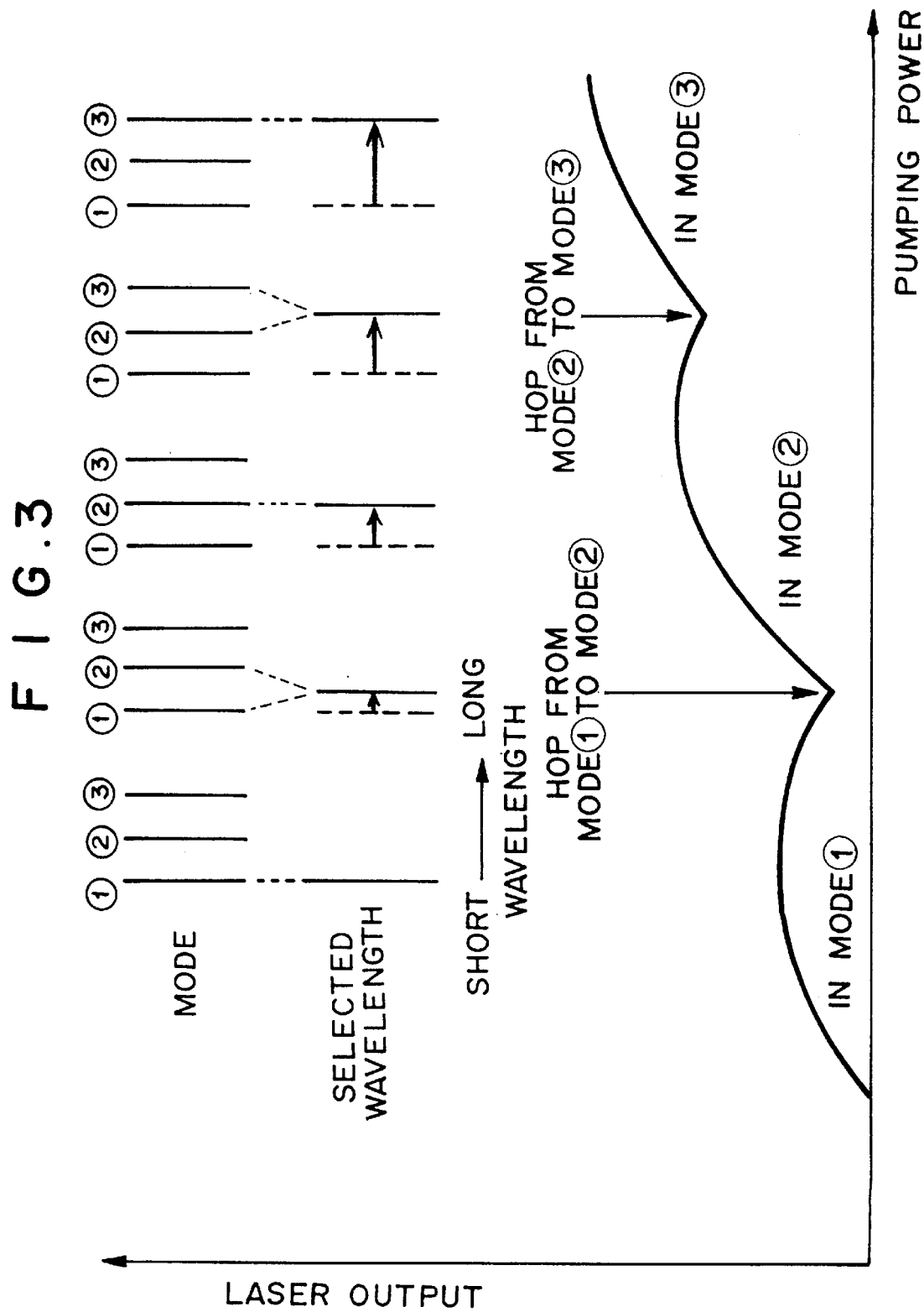
FIG. 3 is a view showing the relation between the pumping power and the laser output and the relation between the oscillation mode and the wavelength selected by the wavelength selector in a high output laser-diode-pumped solid state laser.
Figure 4:
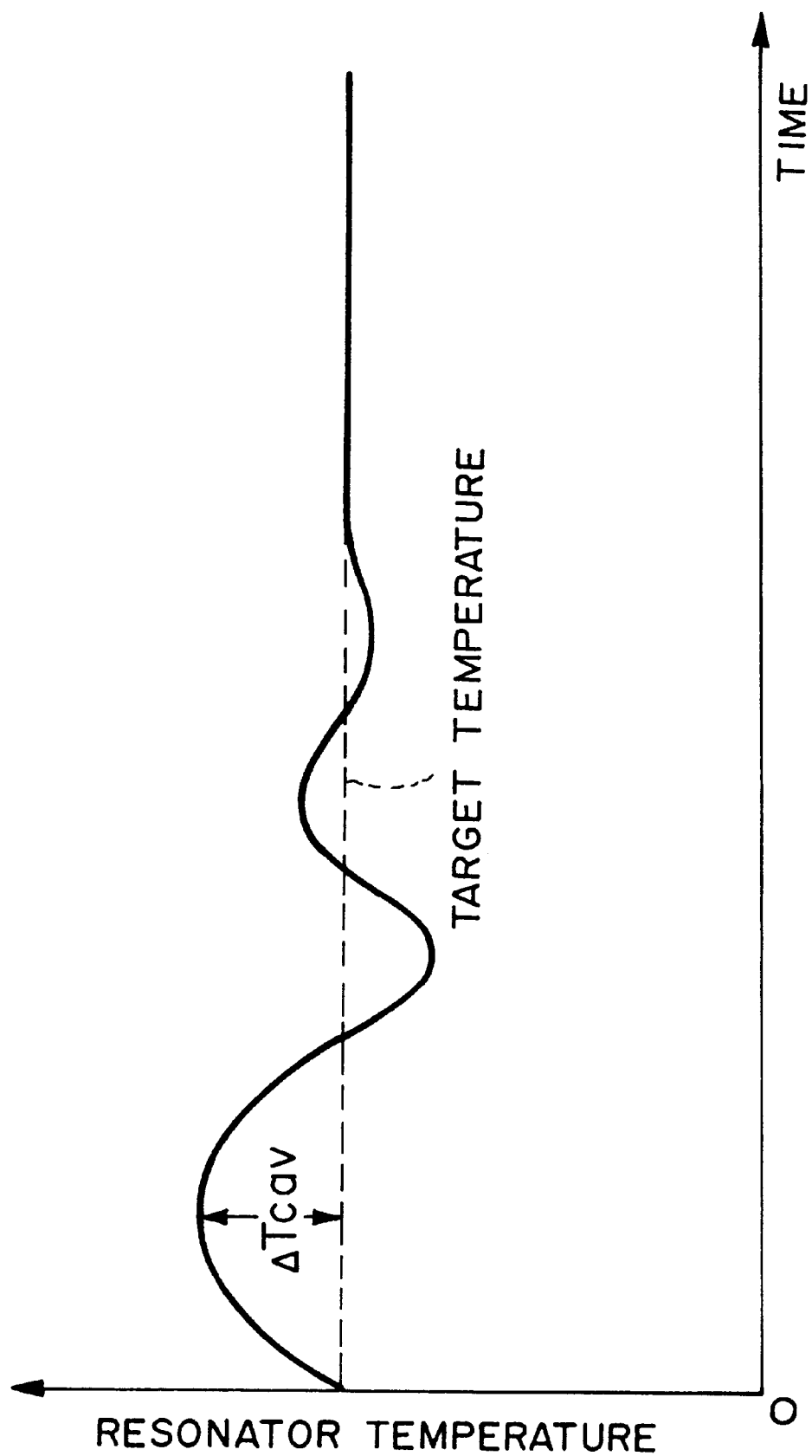
FIG. 4 is a view showing change in the temperature of the resonator with time during starting of the laser.

In FIG. 1, a laser-diode-pumped solid state laser in accordance with an embodiment of the present invention comprises a laser diode (semiconductor laser) 11 which produces a laser beam 10 as a pumping beam, condenser lenses 12a and 12b which condense the laser beam 10, which is produced as divergent light, a YLF crystal 13 which is a solid laser medium doped with neodymium (Nd) (will be referred to as "Nd:YLF crystal 13", hereinbelow), a resonator mirror 14 disposed forward (the right side as seen in FIG. 1) of the Nd:YLF crystal 13 and a wavelength convertor 15 disposed between the resonator mirror 14 and the Nd:YLF crystal 13.

A Brewster plate 16 as a polarization control element, an etalon 17 as a wavelength selector and a pinhole plate or a slit plate 18 as a transverse mode control element are disposed between the resonator mirror 14 and the Nd:YLF crystal 13. A pair of λ/4 plates 19 and 20 for converting the oscillation mode to a twist mode, thereby preventing hole burning are disposed on opposite sides of the Nd:YLF crystal 13.

The elements 13 to 20 described above are fixed to a resonator holder 21 of Cu—Be or the like. The resonator holder 21 is fixed to a cooling surface of a Peltier element 22. In this embodiment, a Fabry-Perot resonator is formed by the λ/4 plate 19 and the resonator mirror 14 as will be described later. The resonator is a kept at a predetermined temperature by the Peltier element 22 which is controlled by a temperature control circuit (not shown).

The laser diode 11 produces a laser beam 10 having a wavelength of 797 nm. Neodymium ions in the Nd:YLF crystal 13 are stimulated by the laser beam 10 and the Nd:YLF crystal 13 thereby produces a laser beam having a wavelength of 1314 nm. The pumping light incident side end face 19a of the λ/4 plate 19 is provided with a coating which is antireflecting (a transmittance of not lower than 99%) at 797 nm (the wavelength of the pumping leaser beam 10) and highly reflecting (a reflectivity of not lower than 99.9%) at 1314 nm. The mirror surface 14a of the resonator mirror 14 is provided with a coating which is highly reflecting at 1314 nm and transmits light of 657 nm (the wavelength of second harmonic to be described later).

Thus the light beam of a wavelength of 1314 nm resonates between the surfaces 19a and 14a and generates laser oscillation. The laser beam 30 thus produced is converted by the wavelength convertor 15 into its second harmonic 31 having a wavelength of 657 nm equal to a half of the wavelength of the laser beam 30. The second harmonic 31 is mainly output from the resonator mirror 14. As the wavelength convertor 15, for instance, a LiNbO$_3$ crystal doped with MgO and formed with periodic domain reversals may be used.

In the laser-diode-pumped solid state laser of this embodiment, the internal power of the resonator is not lower than 10 W and close to 20 W. Accordingly one having low absorption characteristics is employed as the etalon 17. In the conventional laser-diode-pumped solid state laser which is equivalent to the solid state laser of this embodiment in the internal power of the resonator, the temperature increase of the etalon is about 8° C., whereas the temperature increase of the etalon 17 in the solid state laser of this embodiment is only about 1° C.

Such low absorption characteristics can be provided, for instance, by carrying out annealing on the etalon 17 at 150° C. for 12 hours in atmosphere, or by providing Hf coating on the light passing face of the etalon 17 instead of Ti coating which has been in wide use, or by properly selecting the material of the substrate of the etalon 17.

By use of an etalon 17 having characteristics described above, mode hop cannot take place in the laser-diode-pumped solid state laser of this embodiment even if the pumping power is increased to increase the output power. Accordingly when the automatic power control is effected, a stable operation of the laser can be obtained. Further when the laser beam absorption of the etalon 17 is small, loss is small and accordingly output of the laser is increased.

In the laser-diode-pumped solid state laser of this embodiment, by virtue of the small laser beam absorption of the etalon 17, the transient temperature increase ΔTcav of the resonator upon starting of the laser can be suppressed smaller than about 1° C., whereby the time for which a plurality of longitudinal modes appear to make stable the laser output and noise is generated due to mode competition can be shortened. In the laser-diode-pumped solid state laser of this embodiment, the time required to obtain a stable output is reduced to one fourth as compared with a conventional laser-diode-pumped solid state laser which is equivalent in the output power.

Though the laser-diode-pumped solid state laser of the embodiment described is of a type where the solid laser beam 30 is converted into its second harmonic 31 by the wavelength convertor 15, the present invention can be applied to laser-diode-pumped solid state lasers where such wavelength conversion is not carried out.

What is claimed is:

1. A laser-diode-pumped solid state laser in which a solid state laser crystal is pumped by a light beam produced by a laser diode and comprises a resonator having an internal power which is not lower than 10 W, and a temperature control means which keeps the inside temperature of the resonator at a predetermined temperature and, a wavelength selector which is disposed in the resonator and selects an oscillation mode from a plurality of oscillation modes in the resonator, thereby making the laser oscillate in a single mode, said wavelength selector having a temperature characteristic in response to laser beam absorption such that a maximum increase in temperature of the wavelength selector does not change said oscillation mode.

2. A laser-diode-pumped solid state laser as defined in claim 1 in which said maximum increase in temperature of the wavelength selector is smaller than 2° C.

3. A laser-diode-pumped solid state laser in which a solid state laser crystal is pumped by a light beam produced by a laser diode and comprises a resonator having an internal power which is not lower than 10 W, and a temperature control means which keeps the inside temperature of the resonator at a predetermined temperature and, a wavelength selector which is disposed in the resonator and selects an oscillation mode from a plurality of oscillation modes in the resonator, thereby making the laser oscillate in a single mode, means for limiting an increase in temperature of said wavelength selector so as to maintain said oscillation mode in the resonator.

4. A laser-diode-pumped solid state laser as defined in claim 3 in which said means limits the increase in temperature of the wavelength selector to less than 2° C.

* * * * *